United States Patent [19]
McLevige

[11] Patent Number: 6,102,001
[45] Date of Patent: Aug. 15, 2000

[54] VARIABLE DISPLACEMENT PUMP FUEL METERING SYSTEM AND ELECTROHYDRAULIC SERVO-VALVE FOR CONTROLLING THE SAME

[75] Inventor: Daniel J. McLevige, Davis, Ill.

[73] Assignee: Woodward Governor Company, Rockford, Ill.

[21] Appl. No.: 09/206,105

[22] Filed: Dec. 4, 1998

[51] Int. Cl.$^7$ .................................................. F02D 7/00
[52] U.S. Cl. .......................................... 123/387; 123/357
[58] Field of Search .................................. 123/357, 387, 123/386, 385

[56] References Cited

U.S. PATENT DOCUMENTS

| | | | |
|---|---|---|---|
| 2,010,420 | 8/1935 | Simmen | 123/387 |
| 2,931,429 | 4/1960 | Brown | 158/11 |
| 2,939,522 | 6/1960 | Morely et al. | 158/36.4 |
| 3,121,456 | 2/1964 | McCathron et al. | 158/36.4 |
| 3,600,889 | 8/1971 | Ifield | 60/39.28 |
| 3,614,946 | 10/1971 | Staudt | 123/387 |
| 3,738,104 | 6/1973 | Rosa | 60/39.28 |
| 3,826,586 | 7/1974 | Richards | 415/42 |
| 3,909,159 | 9/1975 | Jansen et al. | 417/374 |
| 3,941,498 | 3/1976 | Duckworth et al. | 415/46 |
| 3,953,153 | 4/1976 | Huber et al. | 417/204 |
| 4,102,606 | 7/1978 | Huber et al. | 417/204 |
| 4,142,497 | 3/1979 | Long | 123/139 |
| 4,222,712 | 9/1980 | Huber et al. | 417/204 |
| 4,417,849 | 11/1983 | Morris | 415/131 |
| 4,429,528 | 2/1984 | Matthews et al. | 60/39.281 |
| 4,474,104 | 10/1984 | Creffield | 91/497 |
| 4,475,519 | 10/1984 | Eheim | 123/387 |
| 4,495,916 | 1/1985 | Shinopa | 123/387 |
| 4,527,958 | 7/1985 | Borman | 417/213 |
| 4,564,341 | 1/1986 | Tanaka | 417/462 |
| 4,606,191 | 8/1986 | Collins et al. | 60/39.281 |
| 4,710,106 | 12/1987 | Iwata et al. | 417/213 |
| 4,711,619 | 12/1987 | Sundberg et al. | 418/27 |
| 4,715,788 | 12/1987 | Kouns et al. | 417/218 |
| 4,811,711 | 3/1989 | Stumpp | 123/387 |
| 4,823,552 | 4/1989 | Ezell et al. | 60/443 |
| 5,028,214 | 7/1991 | Masuda | 417/218 |
| 5,168,704 | 12/1992 | Kast et al. | 60/420 |
| 5,190,445 | 3/1993 | Ikari | 417/218 |
| 5,211,530 | 5/1993 | Shiffler | 415/48 |
| 5,226,800 | 7/1993 | Morino | 417/218 |
| 5,241,826 | 9/1993 | Stearns | 60/736 |
| 5,299,920 | 4/1994 | Stearns | 417/426 |
| 5,378,112 | 1/1995 | Nasvytis | 417/213 |
| 5,404,855 | 4/1995 | Yen et al. | 123/446 |
| 5,438,832 | 8/1995 | Yonekubo et al. | 60/449 |
| 5,443,046 | 8/1995 | White | 123/438 |
| 5,479,899 | 1/1996 | Phelps | 123/463 |
| 5,482,441 | 1/1996 | Permar | 417/216 |
| 5,538,403 | 7/1996 | Black | 417/253 |

*Primary Examiner*—Carl S. Miller
*Attorney, Agent, or Firm*—Leydig, Voit & Mayer

[57] ABSTRACT

A variable displacement pump fuel metering system wherein an electrohydraulic servo-valve powers a pump actuator to control pump displacement and variably bypasses fuel as an integrally related function to improve flow dynamics. The electrohydraulic servo-valve withdraws fuel from the pump output flow to drive the pump actuator and thereby control the displacement of the pump. The amount of bypassed is inversely proportional to the amount of fuel used to drive the actuator so that metered flow is maintained when an increase in pump output is demanded. The variable displacement pump may also meter flow in the downstream manifold. The electrohydraulic servo-valve is electrically controlled in a closed loop circuit with a flow sensing valve providing the feedback to an electronic engine controller. The electronic controller directly controls the electrohydraulic servo-valve.

24 Claims, 6 Drawing Sheets

VARIABLE DISPLACEMENT PUMP FUEL METERING SYSTEM AND ELECTROHYDRAULIC SERVO-VALVE FOR CONTROLLING THE SAME

FIELD OF THE INVENTION

This invention relates generally to fuel delivery systems and more particularly to fuel metering systems for gas turbine engines.

BACKGROUND OF THE INVENTION

In the art of aircraft fuel control systems, a common approach of metering fuel to gas turbine engines has included the use of a positive displacement pump, commonly a gear pump driven by the engine gear box, as the main fuel pump. In these prior systems, the pump outputs fuel flow in excess of engine burn requirements to ensure that sufficient fuel is always delivered to the engine. The output fuel flow is then metered by a selectively positioned fuel metering valve that restricts flow through the manifold to provide a selected flow rate in the manifold. Excess fuel is recirculated through a large fuel bypass from the manifold downstream of the pump back to the pump inlet.

A significant drawback with positive displacement pump fuel metering systems occurs during operation of the aircraft at low fuel consumption and high engine speed situations, such as when the aircraft is at idle descent from a high altitude. Under such conditions, the pump outputs a flow of fuel that is many times the metered flow needed by the engine combustion chamber. Therefore, much of the fuel is forced to recirculate through the fuel bypass which undesirably increases the temperature of the fuel. The fuel temperature increase from such high bypass flows causes various heat management problems for the aircraft and represents lost horsepower. These heat management problems have required aircraft to use larger, heavier and costlier heat exchangers and other heat management systems.

To overcome these heat management problems associated with positive displacement fuel metering systems, some aircraft fuel metering systems may include variable displacement pumps. Variable displacement pumps can reduce the large recirculated bypass flow associated with positive displacement pump fuel metering systems. To achieve a reduction in bypass flow, the displacement of the variable displacement pump is adjusted so that the pump output approximately equals the metered flow which is set by a selectively positioned fuel metering valve in the downstream manifold.

One significant disadvantage with prior variable displacement pumps in fuel metering systems is that of slower dynamic response. This is because the displacement of the pump is set by a servo actuator which in turn is driven by a portion of the pumped fuel flow in the downstream manifold. To achieve sufficient control over variable displacement pumps, the servo actuator needs a fairly large amount of displacement flow to overcome the friction forces within the variable displacement pump. This means that for sudden demands to increase pump output, a substantial amount of fuel is removed from the downstream manifold to drive the servo actuator and thereby change pump displacement accordingly. This causes a momentary dip in metered flow and may cause the metered flow to actually go the wrong direction after an initial step increase for the demanded metered flow.

SUMMARY OF THE INVENTION

A general aim of the present invention is to provide for improved flow dynamics in variable displacement pump fuel metering systems.

It is an object of the present invention to provide a variable displacement pump fuel metering system having a more immediate response to demanded increases in pump output.

A related object of the present invention is to provide for improved closed loop control of variable displacement pumps in fuel metering systems.

Another related object of the present invention is to reduce the cost and weight of aircraft fuel metering systems.

It is therefore a feature of the present invention to provide a variable displacement pump fuel metering system having an electrohydraulic servo-valve (EHSV) or other similar control valve that has an internal fuel bypass. In the preferred embodiment, the variable displacement pump delivers fuel from an upstream manifold to a downstream manifold. An EHSV draws fuel from the downstream manifold to work a pump actuator and thereby change the pump output. A valve operator disposed in the EHSV controls both the displacement flow to the pump actuator and flow through the fuel bypass.

In one embodiment, the EHSV simultaneously changes the fuel flow through the fluid bypass and fuel flow to the actuator to improve fuel flow dynamics. When demanded fuel flow from the pump is increased, the increased amount of fuel used to power the actuator is offset by a decreased amount of fuel bypassed. This maintains or increases the metered flow of fuel in the downstream manifold and eliminates temporary dips in metered fuel flow.

In another embodiment, the EHSV modulates fuel flow through the bypass to accommodate small demanded changes in metered flow while it sends displacement flow to the pump servo for larger demanded changes in the metered flow. An advantage of this embodiment is that the pump and actuator are adjusted less frequently which increases lifespan of the pump and actuator.

The present invention also provides a method of improving flow dynamics in a fuel metering system using a variable displacement pump controlled by an actuator. According to the preferred embodiment of the method, fuel is withdrawn from the manifold downstream of the pump. A portion of the withdrawn fuel is bypassed while another portion of the withdrawn fuel is used to power the pump actuator. As the portion of fuel used to power the actuator increases, the portion of fuel bypassed decreases. This maintains the flow of fuel in the manifold downstream of the pump.

It is a related feature of the preferred embodiments that the variable displacement pump meters flow directly through closed loop control. The preferred embodiments preferably include a flow sensing valve that provides feedback on the flow rate in the downstream manifold to an electronic engine controller. The electronic engine controller matches the feedback signal with an external demand signal to command the EHSV to selectively position the pump actuator. The EHSV sets a position of the actuator which corresponds to the demand flow rate in the downstream manifold. An advantage of the disclosed embodiments is that a selectively positioned fuel metering valve is not needed.

These and other objects and advantages of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
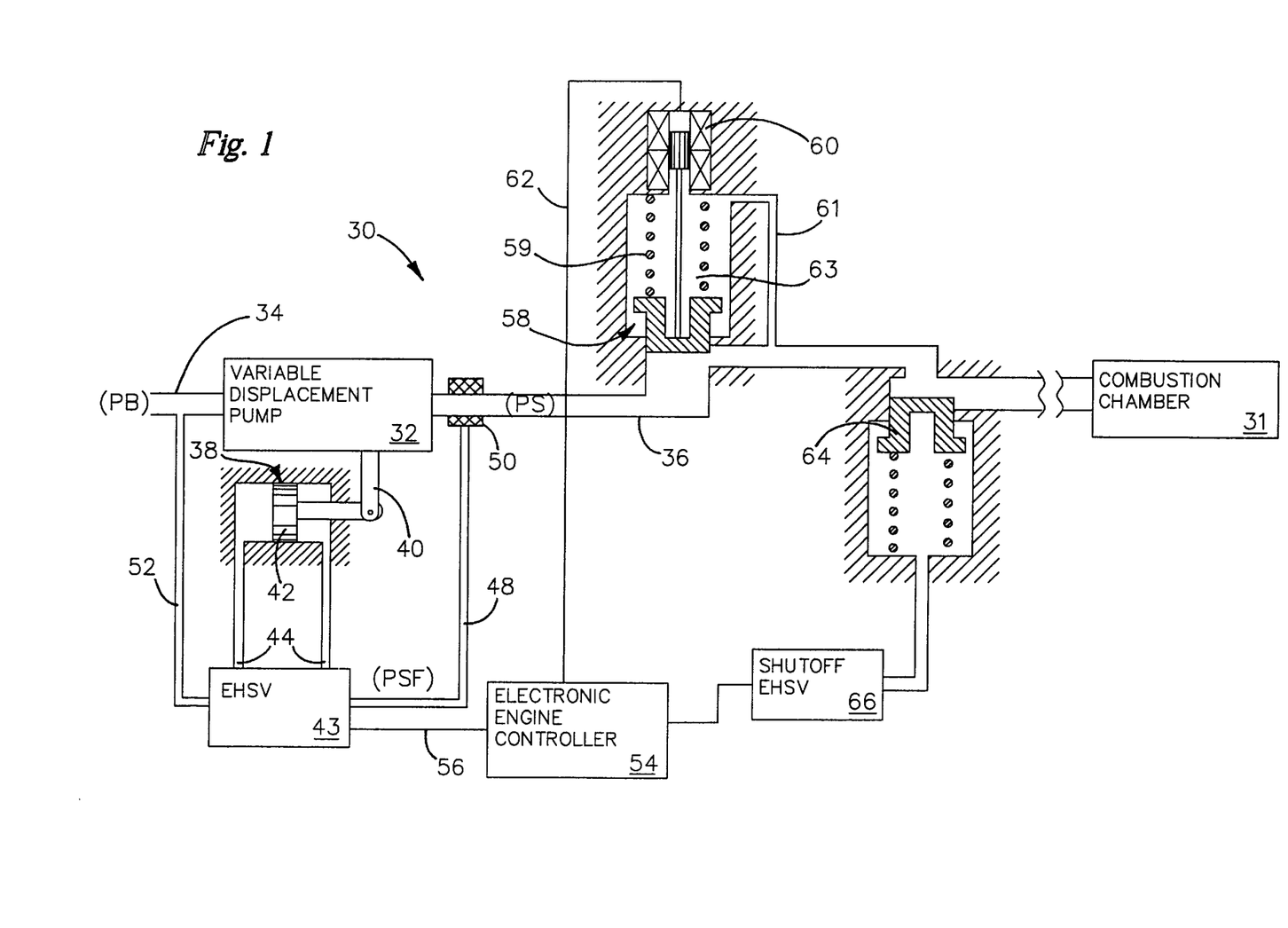
FIG. 1 is an exemplary schematic illustration of a fuel metering system using a variable displacement pump according to the preferred embodiment of the present invention.

For purposes of illustration and referring to FIG. 1, a preferred embodiment of the present invention is illustrated schematically as a fuel metering section 30 of an aircraft fuel delivery system for delivering a metered flow of fuel to an engine combustion chamber indicated schematically at 31. The aircraft fuel metering section 30 includes a variable displacement pump 32 for pumping fuel from an upstream manifold 34 to a downstream manifold 36. During operation, the upstream manifold 34 feeds a supply of fuel at a lower pressure (PB) to the pump 32. It will be understood that the upstream manifold 34 for an aircraft fuel system may include a fuel tank (not shown) and/or a boost pump (not shown). The pump 32 increases fuel pressure to provide a higher pressure hydraulic source (PS) to the downstream manifold 36 which generally includes the fluidic connection from the pump to the combustion chamber 31 of a gas turbine engine.

The variable displacement pump 32 is preferably of the vane type and provides for a variable output flow. To control the pump output flow, the pump 32 is mechanically connected to an actuator, shown in the form of a selectively positioned servo actuator 38 with the mechanical connection illustrated schematically as crank lever arm 40. The servo actuator 38 includes a movable piston member 42 responsive to hydraulic power that sets the displacement of the variable displacement pump 32 and thereby controls the output flow provided to the downstream manifold 36.

The preferred embodiment includes an electrohydraulic servo-valve (EHSV) 43 or other actuator control valve for controlling the servo actuator 38 and therefore the pump output. To control servo actuator position, the EHSV 43 selectively sends hydraulic power to the servo actuator 38 via a working output connection 44. In operation, the EHSV 43 furnishes a displacement flow to the actuator 38 by drawing fuel from the higher pressure fuel source (PS) provided by the pump 32. The EHSV 43 returns fuel to the lower pressure supply (PB) feeding the pump 32. To receive the high pressure source (PS), the EHSV 43 has an inlet 48 which draws fuel from the downstream manifold 36. In order to prevent any impurities in the downstream manifold 36 fuel from interfering with the smooth operation of the EHSV 43, a wash filter 50 is located at the downstream manifold 36 connection which also may cause a small pressure drop (PSF) in the inlet 48. To connect the EHSV 43 to the lower pressure fuel supply (PB), the EHSV 43 has an outlet 52 connected to the upstream manifold 34.

In the preferred embodiment, an electronic engine controller (EEC) 54 directly controls the pump 32 by commanding the EHSV 43 to provide hydraulic power to the servo actuator 38. To provide a selected flow rate in the downstream manifold 36, the EEC 54 sends an electrical control signal on line 56 to the EHSV 43. The electrical control signal has a magnitude related to the changes needed in the pump 32 output flow. To provide closed loop control, the preferred embodiment includes a flow meter or other appropriate flow sensing means, shown in the form of a flow sensing valve 58 that takes a position as a function of the metered fuel flow through the downstream manifold 36 to the combustion chamber. A spring 59 biases the flow sensing valve 58 against the metered flow to provide a small pressure drop across the flow sensing valve 58 in the downstream manifold 36. The valve 58 senses this pressure drop by having a fuel feedback conduit 61 that communicates lower pressure fuel to the valve cylinder chamber 63 so that the flow sensing valve 58 takes an axial position as a function of metered flow. To complete the loop, the flow sensing valve 58 includes a position sensing device 60, such as a dual linear variable displacement transducer, which reports a feedback signal via line 62 indicating the sensed flow rate to the EEC 54. The EEC 54 matches the feedback signal on line 62 with an external demand signal relating to a demanded flow rate for the downstream manifold 36 to produce the electrical control signal in line 56. The electrical control signal coupled along line 56 commands the EHSV 43 to set the displacement of the pump 32 which will accommodate the demanded flow rate in the downstream manifold 36.

To better illustrate a preferred location of flow sensing valve 58 and variable displacement pump 32, the schematic drawing of FIG. 1 schematically illustrates a conventional pressurizing and shutoff valve 64. The pressurizing and shutoff valve 64 is connected to the downstream manifold 36 and is controlled by a separate shutoff electrohydraulic servo-valve 66. It will be understood to those skilled in the art that the pressurizing and shutoff servo-valve 64 provides a minimum pressure function during operation and zero leakage during shutoff. In viewing FIG. 1, it can be seen that the flow sensing valve 58 is connected to the downstream manifold 36 and interposed between the pump 32 and the pressurizing and shutoff valve 64.

An advantage of using the EHSV 43 to control the servo actuator 38 directly, is that the metering of fuel in the downstream manifold 36 can be accomplished solely by changing the output from the variable displacement pump 32. Thus, a selectively positioned fuel metering valve is not necessary to meter flow. This reduces weight, size, and cost of the fuel metering section 30 for aircraft fuel systems.

In accordance with the aims and objectives of the present invention, the preferred embodiment of the present invention bypasses fuel to improve flow dynamics for metered flow of fuel in the downstream manifold 36. To accomplish this in the preferred embodiment of the present invention, the EHSV 43 controllably bypasses fuel by internally porting fuel from the inlet 48 to the outlet 52 to improve flow dynamics. The EHSV 43 performs both functions of bypassing fuel and controlling the actuator 38 in a functionally related way that improves flow dynamics in the fuel metering section of aircraft fuel systems as will be described in further detail below.

Figure 2A:
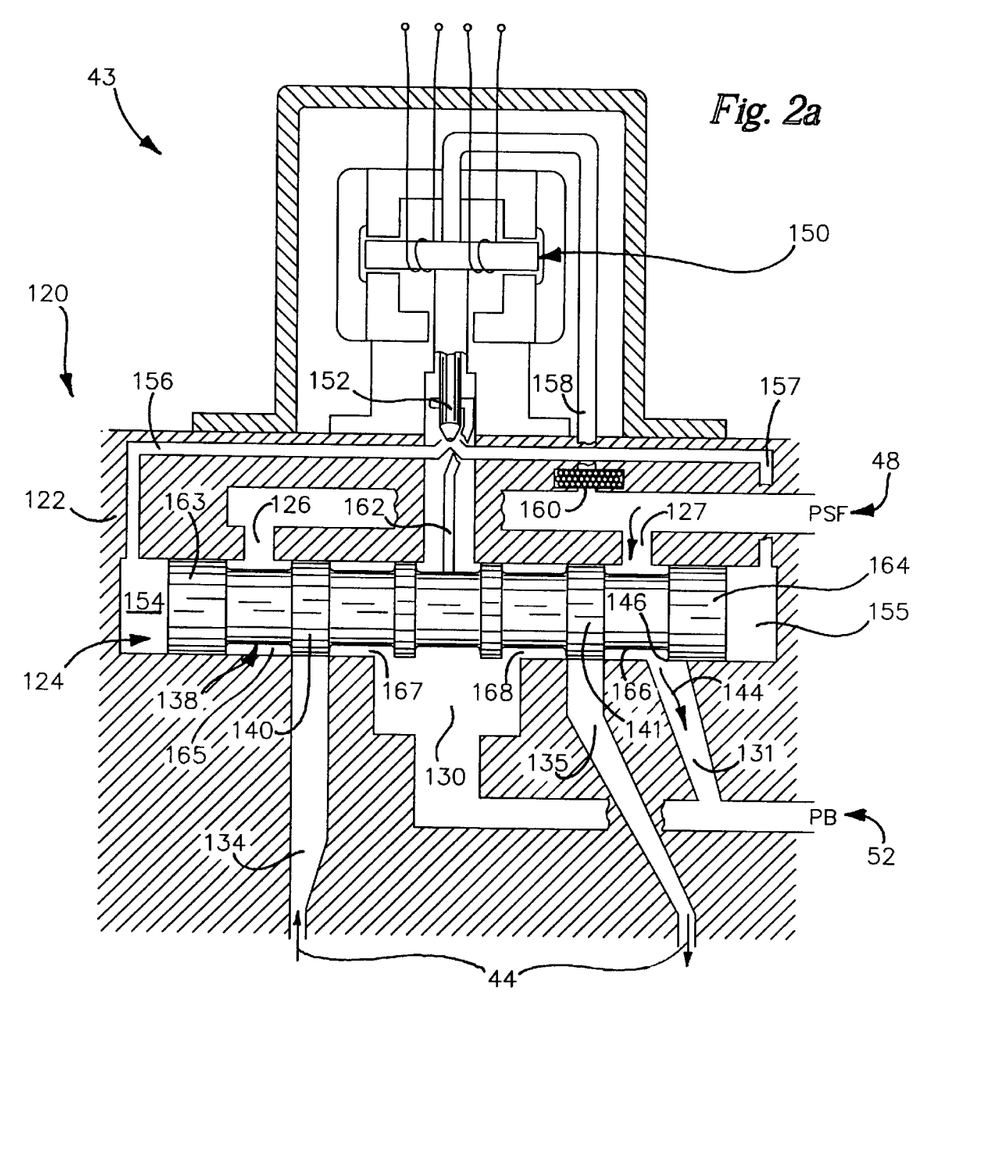
FIG. 2a is a partly fragmentary cross-sectional view of an electrohydraulic servo-valve according to the preferred embodiment of the present invention.
Figure 2B:
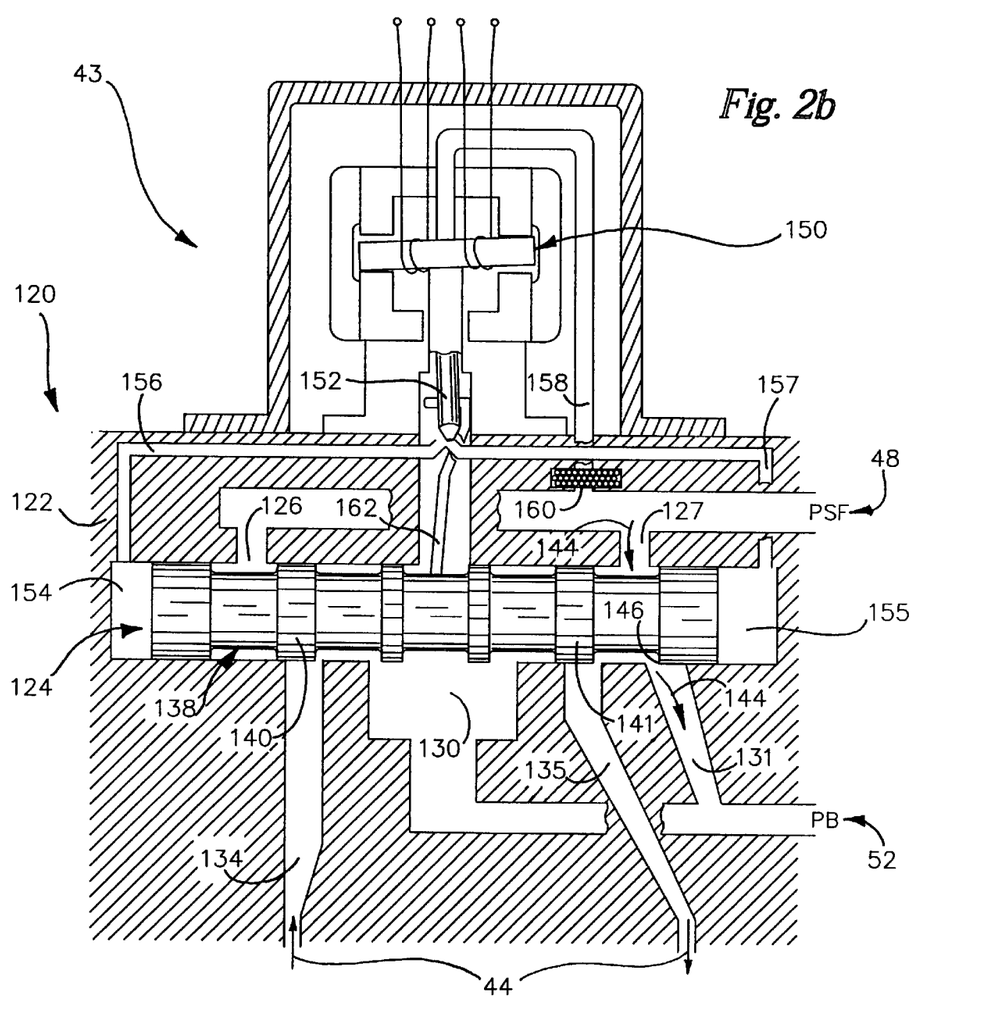
FIG. 2b is a partly fragmentary cross-sectional view of the electrohydraulic servo-valve of FIG. 2a having a valve spool position to increase output flow.

A first embodiment of the EHSV 43 of the present invention which improves the flow dynamics is schematically exemplified in FIG. 2a. FIGS. 2a and 2b is a cross-sectional view of the electrohydraulic servo valve 43 illustrated in partly fragmentary view to ensure that all of the flow passages and ports in the valve may be seen in one view to facilitate an easier understanding of the embodiment and the invention. The EHSV 43 includes an actuator control valve, which is illustrated as a spool valve 120, that integrally performs the functions of bypassing fuel and providing displacement flow to the output connection 44. Referring to the spool valve 120 itself, there is included a valve body 122 defining a cylindrical bore 124 with inlet ports 126, 127 connected to the inlet 48; an outlet port 130 and a spill port 131 connected to the outlet 52; and working output ports 134, 135 connected to the output connection 44.

To control fluid flow between ports, the spool valve 120 includes a movable spool 138 or other movable valve operator. The spool 138 has an enlarged cylindrical portion closely fitting within the bore 124 that includes two throttling lands 140, 141, and two control chamber lands 163, 164 closely fitted within the bore. Between adjacent control chamber lands 163, 164 and throttling lands 140, 141, there is a smaller diameter portion to provide annular recess chambers 165, 166 that fluidically communicate with the inlet ports 126, 127, respectively. The spool 138 also includes smaller diameter annular recess chambers 167, 168 on the inward side of the throttling lands 140, 141.

The axial position of the spool 138 determines the axial position of the throttling lands 140, 141 and therefore the degrees of openings and fuel flow between the various ports of the valve. As shown, the actuator control valve provides for 4-way flow meaning that the throttling lands 140, 141 alternatively pressurize and exhaust the working output ports 134, 135. The axial position of the throttling lands 140, 141 controls the amount of fuel that flows from the inlet ports 126, 127 through the recess chambers 165, 166 to the output ports 134, 135. Likewise, the axial position of the spool 138 also controls the degree of opening from each of the working output ports 134, 135 through the inner recess chambers 167, 168 to the outlet port 130. Although 4-way flow is showing, it will be understood that the present invention also includes valves with 3-way flow that alternatively pressurize and exhaust a single working output or other appropriate valve configuration.

The spool valve 120 bypasses fuel from the downstream manifold 36 to the upstream manifold 34 (shown in FIG. 1) by connecting the inlet 48 to the outlet 52 by way of a bypass spill passage generally indicated by an arrow at 144 that connects inlet port 127 to the spill port 131 through an annular recess chamber 166. As shown in FIG. 2a, the land 146, also closely fitted within the bore, to change the degree of opening to the spill port 131.

Axial translation of the spool 138 positions the lands 140, 141, 146 in the bore 124 to change flow through the output ports 134, 135 and the spill port 131. To accomplish translation of the spool 138, the EHSV 43 includes an electrical actuator or other control means for selectively positioning the spool 138, shown as torque motor 150. The torque motor 150 receives the electrical control signal from the EEC 54 (shown in FIG. 1) and takes an angular position that is proportional to the current in the electrical control signal. A jet pipe 152 coupled with the torque motor 150 provides hydraulic output to two control chambers 154, 155 defined in the valve body 122 via corresponding passages 156, 157. The jet pipe 152 draws its hydraulic power from the inlet 48 via conduit 158 through filter 160. The angular position of jet pipe 152 changes the fluid pressures in control chambers 154, 155 which in turn engages the respective control chamber lands 163, 164 to position the spool 138 inside the valve body 122. A feedback spring 162 which has its upper end fixed and it lower end attached to the spool 138 ensures that the position of the spool 138 is proportional to the electrical current that is applied to the torque motor 150.

In accordance with the object of improving fuel flow dynamics in a variable displacement pump fuel metering system, the preferred embodiment simultaneously changes the amount of fuel bypassed through the bypass spill passage 144 and the amount of fuel used for servo actuator 38 displacement flow. When the EEC 54 sends an electric control signal demanding the EHSV 43 to increase metered flow from the variable displacement pump 32, the valve spool 138 is axially translated to a position which increases displacement flow through the output connection 44, such a position is shown in FIG. 2b. As the spool 138 translates from the position in FIG. 2a to the position in FIG. 2b, the throttling lands 140, 141 simultaneously change the degree of openings between ports in a manner that increases the amount of flow drawn from the inlet 48 to the output port 135, and decreases the amount of flow drawn from the inlet 48 along the bypass spill passage 141 and through the spill port 131. The reduced portion of flow drawn through the spill port 131 offsets the increased portion of fuel drawn through the output port 135. By having such an inverse fuel flow relationship between output port 135 and spill port 131, demand signals to increase metered flow do not increase flow drawn from the downstream manifold 36 (see FIG. 1) through the inlet 48. This improves flow dynamics for the metering of fuel and eliminates temporary dips in metered flow when demanded metered flow is increased.

Figure 3:
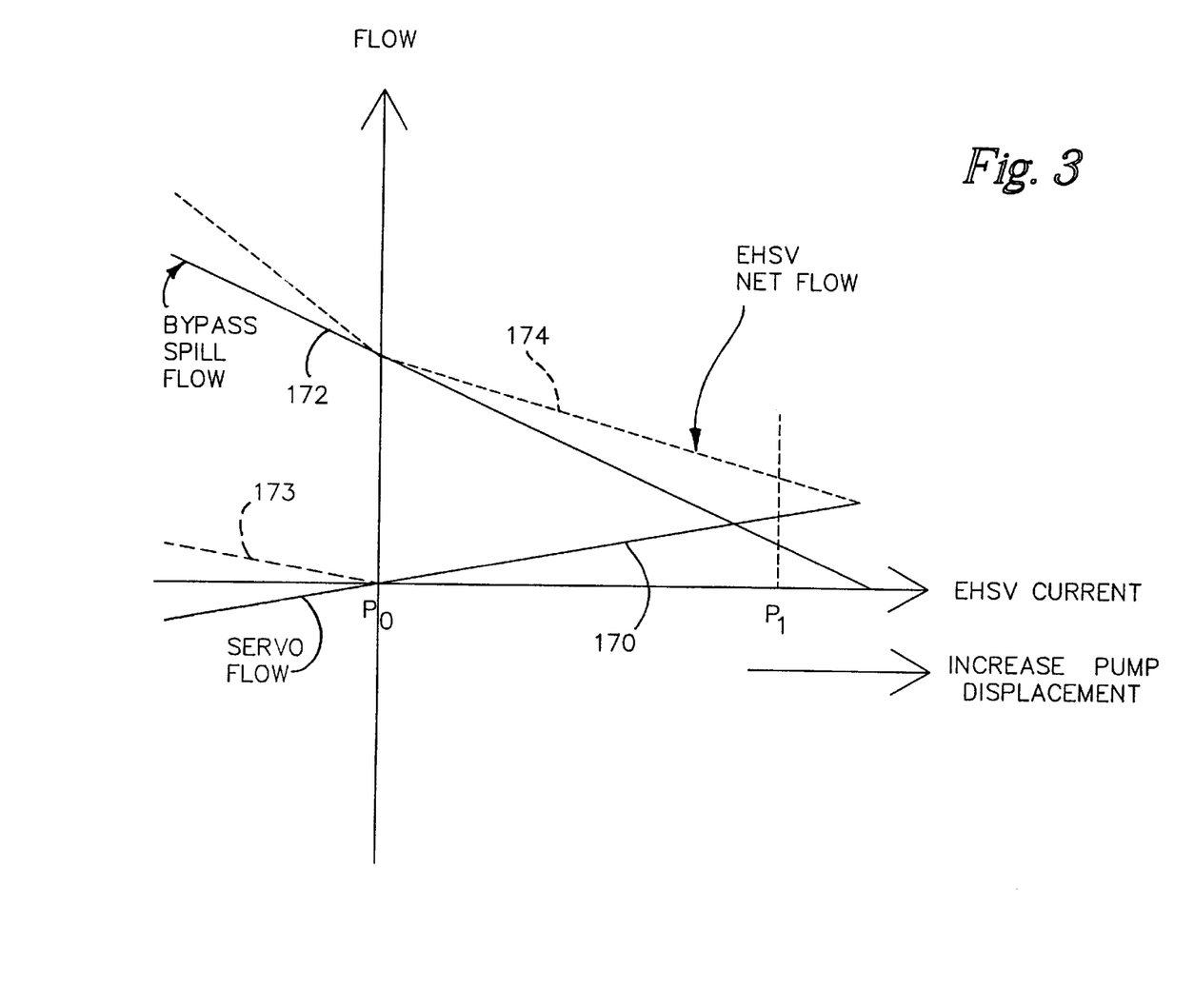
FIG. 3 is a graph exemplifying an improved flow dynamic for the fuel metering system of FIG. 1 using the electrohydraulic servo-valve of FIGS. 2a and 2b.

The improvement in flow dynamics provided by the preferred embodiment of the present invention will better be appreciated with reference to FIG. 3 showing a graph plotting flow through both bypass and servo vs. torque motor 150 current. For purposes of illustration the increase direction is taken as the direction to increase pump displacement which generally increases metered flow. Because the position of the valve spool 138 (see FIG. 2a) is proportional to current as discussed above, the graph in FIG. 3 may also be thought of as flow vs. spool 138 position. In FIG. 3, the null position of the spool 138 in FIG. 2a is illustrated at position $P_O$ and the spool position of FIG. 2b is illustrated as position $P_I$. In viewing FIG. 3, it can be seen that the displacement flow curve 170 through the working output port 135 (shown in FIGS. 2a and 2b) increases and decreases correspondingly as the current to the EHSV 43 increases and decreases. It will also be seen that the amount of flow through the spill port 131 represented by bypass spill flow curve 172 decreases with increasing current. Thus, it is seen that the bypass spill flow 172 is inversely proportional to the displacement flow 170. In viewing FIGS. 2a and 3, it will be appreciated that flow is drawn through the inlet 48 to the working output port 134 as the spool 138 translates from the null position $P_O$ to a position of decreased pump output (a position opposite $P_I$) which is illustrated by broken line 173.

The net EHSV flow 174 drawn through the inlet is thereby the sum of the absolute values of the spill port flow curve 172 and the servo flow curve 170. In the preferred embodiment of the present invention, the spill port 131 (see FIG. 2a) is wider in the plane perpendicular to the axial translation of the spool 138, and preferably two or more times wider than either of the output ports 134, 135, meaning that the spill port flow curve 172 is of steeper slope than the servo flow curve 170. By having the spill port 131 wider, it is seen that the net EHSV pump flow 174 withdrawn from the downstream manifold 36 (see FIG. 1) decreases with increased current to provide even more immediate response to a demanded increase in metered flow. It should be noted that the flow used by the jet pipe 152 is ignored in the plot of FIG. 3 because it is nearly constant.

It is noteworthy that a relatively small amount of fuel is bypassed through the spill passage 144 to the upstream manifold 34 (see FIG. 1). The amount of fuel bypassed is much less than the metered flow and does not cause a significant increase in fuel temperature which as may be recalled had previously caused significant heat management problems for positive displacement pump fuel metering systems.

Figure 4:
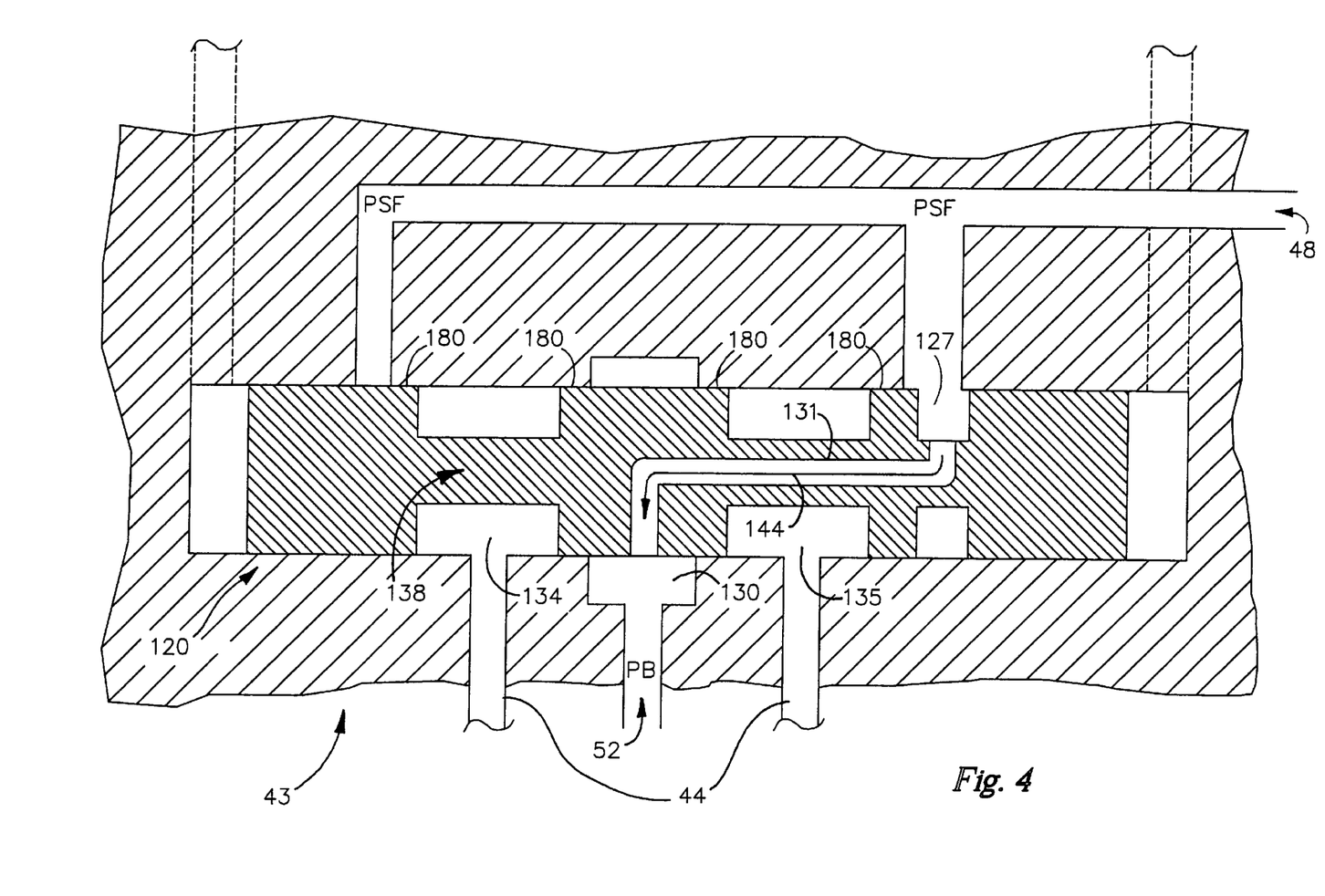
FIG. 4 is a cross-sectional fragmentary view of parts of an electrohydraulic servo-valve according to an alternative preferred embodiment of the present invention.

Turning now to FIG. 4, an alternative second embodiment of the control valve 120 portion of the EHSV 43 is exemplified. To the extent possible, similar valve ports and structures between the first and second embodiments have been provided with common reference characters to facilitate easier understanding. It will also be understood that the embodiment of FIG. 4 provides for way flow for alternatively exhausting and pressuring working output ports 134, 135 similar to that of the first embodiment. Referring in greater detail then to the second embodiment, it is seen that the spill port 131' is a channel defined in the spool 138 itself to provide a spill passage 144' connecting the inlet port 127 to the outlet port 130.

The alternative embodiment of FIG. 4 also provides an additional alternative beneficial use for the spill port 131' which also improves flow dynamics for fuel metering systems. In FIG. 4, the spill port 131' and spill passage 144' fine tune the metered flow provided by the variable displacement pump 32 (see FIG. 1). More specifically, for small changes in demanded metered flow in the downstream manifold 36 (see FIG. 1), the flow is modulated through spill port 131' without servo flow through the output ports 134, 135. To provide for this, it is seen that each of the lands includes an extended positive lap segment 180 which makes each corresponding land wider than its corresponding port. The segments 180 prevent fluid flowing through the output ports 134, 135 for small electrical currents in the torque motor which correspond to spool displacements less than the width of the segments 180. Spool 138 displacements which are greater than the width of the segments 180 cause the inlet 48 and outlet 52 to be connected to the output connection 44 providing servo displacement flow therethrough. Thus, for larger changes in demanded metered flow, flow is controlled by providing servo flow through the output connection 44 to drive the actuator 3 8 (see FIG. 1).

Figure 5:
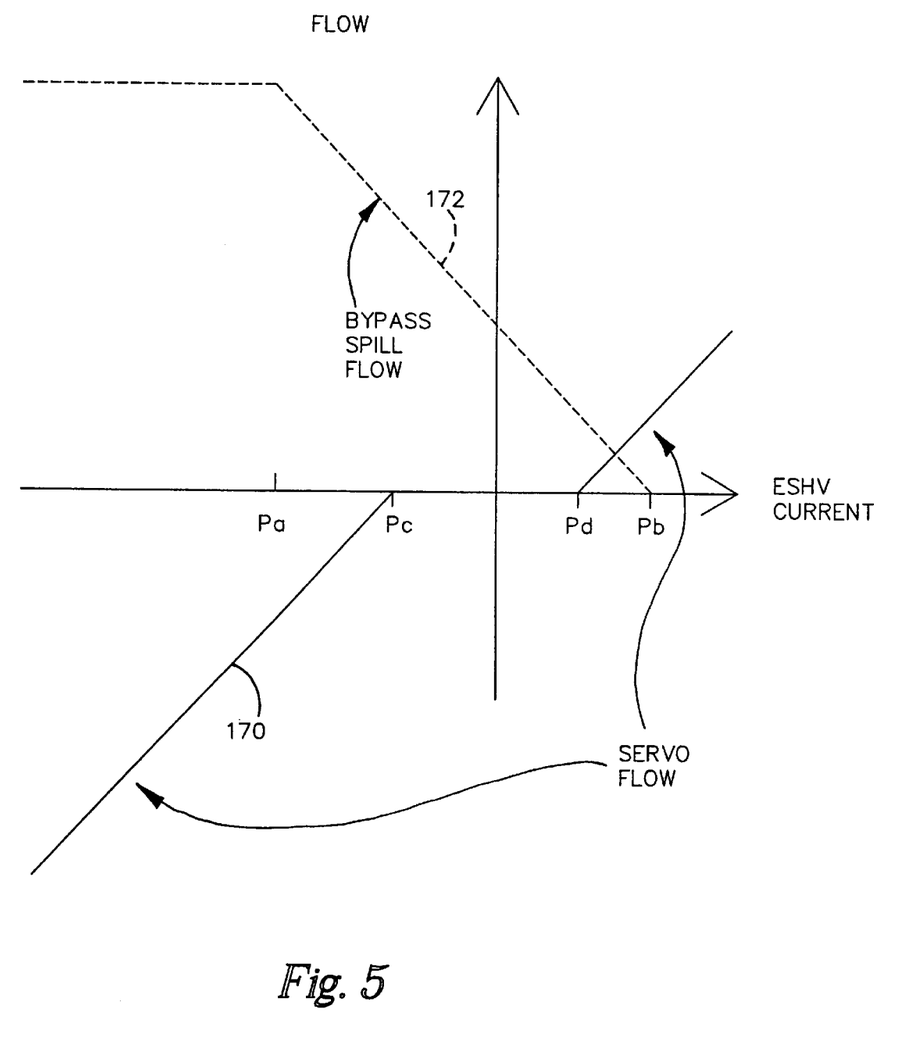
FIG. 5 is a graph showing an improved flow dynamic for the fuel metering system of FIG. 1 using the electrohydraulic servo-valve of FIG. 4.

The action of the spool valve 120 of FIG. 4 can be better appreciated with reference to FIG. 5, a graph plotting flow vs. torque motor current. Because the position of the valve spool 138 is proportional to current as discussed above, the graph in FIG. 5 may also be thought of as flow vs. spool 138 position. It is seen that for smaller magnitude currents between positions $P_c$ and $P_d$ the servo displacement flow curve 170 is flat, representing zero flow, while spill flow curve 172 is steep, representing the modulated flow which adjusts metered flow by bypassing a larger or smaller amount of fuel. For larger currents that position the spool 138 outside positions $P_a$ and $P_b$, the spill flow curve 172 is flat while the servo displacement curve 170 is steep. Thus, the spill flow no longer adjusts the metered flow. Instead, servo displacement flow is sent to the actuator 38 (see FIG. 1) to control metered flow. Also seen in FIG. 5 is that bypass spill flow 172 is inversely related to servo flow 170. Over the range between $P_d$ and $P_b$, the bypass spill flow is inversely proportional so to eliminate any temporary dip in metered fuel flow in the downstream manifold over that range. It will be appreciated that the range between $P_d$ and $P_b$ is adjustable as desired and can be increased or decreased by selecting the porting arrangement or the positive lap provided by the spool 138 and segments 180. It will also be appreciated that positive lap can be provided for lands 140, 141 of the embodiment shown in FIG. 2a and 2b to achieve this effect.

With reference again to FIG. 1, it will be appreciated to those skilled in the art that the embodiments of FIGS. 2a and 2b or 4 may also be used to improve flow dynamics in aircraft fuel metering systems in which the high pressure source (PS) is used to power other actuators not associated with metering flow in the downstream manifold 36. These embodiments can be used with software that compensates metered flow for other servo flow transients. Typically, and as it will be understood, aircraft gas turbine engines have other fuel powered actuators (not shown), such as for variable stator vanes (not shown) or variable compressor bleed valves (not shown). Such actuators often receive their hydraulic power from the fuel source (PS) provided by the downstream manifold 36. These actuators typically require transient flows which are significant as compared to metered flow in the downstream manifold 36. Such transient flows can represent a disturbance to the metered fuel flow in the downstream manifold 36. In a fuel metering system controlled by the EEC 54, additional software compensation may be added to the EEC 54 of the present invention to improve flow dynamics. Since the EEC 54 often both positions the actuators (not shown) for other remote hydraulic systems (not shown) and meters the flow in the downstream manifold 36, such additional software compensation added to the EEC 54 can anticipate when actuator flow is coming and issue a feed-forward increase in metered flow without waiting for a feedback signal indicating a decrease in metered flow.

What is claimed is:

1. A fuel metering system for controlling fuel flow to a combustion chamber, comprising:
   a variable displacement pump adapted to provide a pumped flow of fuel to the combustion chamber;
   an actuator connected to the pump and drivable between multiple positions to control the displacement of the variable displacement pump;
   an actuator control valve operated on fuel, the actuator control valve having an inlet adapted to draw fuel from the pumped flow, a working output adapted to drive the actuator, and a fuel bypass, the actuator control valve including a selectively positioned valve operator therein for controlling fuel flow from the inlet to both the working output and the fuel bypass, the position of the valve operator controlling the fuel flow rate through the fuel bypass as an inversely related function of the fuel flow rate through the working output.

2. The fuel metering system of claim 1 wherein the fuel flow rate through the fuel bypass is linearly inversely proportional to the fuel flow rate through the working output, wherein a reduced flow through the bypass offsets an increased output flow through the working output to drive the actuator to a position which increases the output of the variable displacement pump without dips in the pumped flow.

3. The fuel metering system of claim 2 wherein the valve operator changes fuel flow through the bypass at a greater proportional rate than fuel flow through the working output.

4. The fuel metering system of claim 1 wherein the valve operator has a first range of positions in which the flow through the bypass is dithered while the flow through the working output is constant, and a second range of positions in which fuel flow is output through the working output to drive the actuator to a position of increased pump output, whereby the pumped flow is metered through the bypass for the first range of positions, and the pumped flow is metered by changing pump displacement for the second range of positions.

5. The fuel metering system of claim 1 wherein the variable displacement pump is connected to a fuel supply manifold for receiving fuel, the actuator control valve has an outlet for returning fuel to the fuel supply manifold, and the fuel bypass variably connects the inlet to the outlet.

6. The fuel metering system of claim 1 wherein the actuator control valve comprises a valve body defining a chamber and the valve operator is a movable spool linearly translatable in the chamber to control fuel flow from the inlet to the working output and the fuel bypass.

7. The fuel metering system of claim 1 further comprising:
   flow sensing means responsive to a mass flow rate of the pumped flow for providing a feedback signal indicating said mass flow rate; and
   an electronic controller connected to the flow sensing means, the electronic controller matching the feedback signal with a flow demand signal and then to modify fuel flow to the servo actuator, thereby setting a demanded flow rate for the pumped flow in accordance with the flow demand signal.

8. The fuel metering system of claim 7 wherein the actuator control valve is an electrohydraulic servo-valve including an electrical actuator having an electrical input responsive to an electrical command signal from said electronic controller, the electrical actuator converting the electrical command signal into a selected position of the valve operator to control the fuel flows through the fuel bypass and the working output.

9. The fuel metering system of claim 8 further comprising external control means, responsive to control signals from the electronic controller, for withdrawing fuel from the pumped flow and working mechanical variables in a gas turbine engine, wherein the electronic controller commands the actuator control valve to increase the pumped flow rate before sending a new control signal to the external control means.

10. An electrohydraulic servo-valve for a fuel metering system that controls fuel flow to a combustion chamber, the fuel metering system including a variable displacement pump pumping fuel from a fuel supply manifold to provide a pumped flow of fuel to a combustion chamber and an actuator drivable between multiple positions to control the displacement of the variable displacement pump, comprising:
   a control valve operated on fuel, having an inlet adapted to draw fuel from the pumped flow, a working output adapted to drive the actuator, an outlet adapted to return fuel to the fuel supply manifold, and a bypass port interposed between the inlet and the outlet, the control valve having a valve operator positionable therein, the position of the valve operator controlling fuel flow through the bypass port and fuel flow from the inlet to the working output; and
   an electrical actuator responsive to an external electrical signal for controlling the position of the valve operator.

11. The invention of claim 10 wherein the fuel flow rate through the fuel bypass is linearly inversely proportional to the fuel flow rate through the working output, wherein a reduced flow through the bypass offsets an increased output flow through the working output to drive the actuator to a position which increases the output of the variable displacement pump without dips in the pumped flow.

12. The invention of claim 11 wherein the valve operator changes fuel flow through the bypass at a greater proportional rate than fuel flow through the working output.

13. The invention of claim 10 wherein the valve operator has a first range of positions in which the flow through the bypass is dithered while the flow through the working output is constant, and a second range of positions in which fuel flow is output through the working output to drive the actuator to a position of increased pump output, whereby the pumped flow is metered through the bypass for the first range of positions, and the pumped flow is metered by changing pump displacement for the second range of positions.

14. The invention of claim 10 wherein the electrohydraulic servo-valve includes a valve body defining a chamber, the valve operator being translatable in the chamber, and wherein the chamber has an inlet port in fuel communication with the inlet, an outlet port and a spill port in fuel communication with the outlet, the valve operator providing a first restriction between the inlet port and the working output to regulate fuel flow therethrough and a second restriction between the spill port and the inlet to regulate fuel flow therethrough, the sizes of the first and second restrictions being inversely related and determined by the position of the valve operator.

15. The invention of claim 14 wherein the second restriction is wider than the first restriction in the plane perpendicular to the movement of the valve operator, whereby changes in the position of the valve operator more rapidly changes the fuel flow rate through the bypass as compared with the fuel flow rate through the working output.

16. The invention of claim 14 wherein the electrical actuator is a torque motor coupled with a jet pipe, the jet pipe drawing fuel from the inlet and pressurizing control chambers at opposing ends of the valve operator, the torque motor selectively positioning the jet pipe to change pressures in said opposing chambers to selectively position the valve operator.

17. The invention of claim 16 further comprising:
   flow sensing means responsive to a mass flow rate of the pumped flow for providing a feedback signal indicating said mass flow rate; and
   an electronic controller connected to match the feedback signal with a flow demand signal and couple a command signal to an electrical input of the electrical actuator.

18. A fuel metering system for controlling fuel flow to a combustion chamber comprising:
   a variable displacement pump interposed between an upstream manifold and a downstream manifold,
   an actuator connected to the variable displacement pump to control the displacement of the pump,
   an actuator control valve having an inlet connected to the downstream manifold, an outlet connected to the upstream manifold, a bypass port variably connecting the inlet and the outlet, and a working output connected to the actuator, the actuator control valve including a movable operator for controlling the degree opening from the inlet to the bypass port and from the inlet to the working output, the movable operator having a range of positions that includes a first position and a second position, the degree of opening from the inlet to the working output increasing and the degree of opening of the bypass port decreasing as the movable operator moves from the first to the second position.

19. The fuel metering system of claim 18 wherein the actuator control valve is an electrohydraulic servo-valve including an electrical actuator for converting an external electrical signal into a selected position of the valve operator.

20. The fuel metering system of claim 19 further comprising: flow sensing means for producing a feedback signal indicating a fuel flow rate in the downstream manifold; and an electronic engine controller connected between the flow sensing means and the positioning means for closed loop control, the electronic engine controller comparing an external demand signal with the feedback signal to create a control signal, the external demand signal being related to a selected fuel flow rate for the downstream manifold, the control signal coupled to the positioning means to selectively position the movable operator and thereby provide the selected fuel flow rate.

21. The fuel metering system of claim 19 wherein the valve operator has a plurality of intermediate positions that disconnect the working output from the inlet, and wherein movement of the valve spool between intermediate positions varies the degree of opening to the bypass port to modulate the flow rate in the downstream manifold.

22. A method of improving flow dynamics in a fuel metering system having a variable displacement pump interposed between an upstream manifold and a downstream manifold, and an actuator connected to the variable displacement pump, the position of the actuator varying the displacement of the pump, the method comprising the steps of:

pumping fuel from the upstream manifold to the downstream manifold using the variable displacement pump;

withdrawing a controlled amount of fuel from the downstream manifold;

bypassing a first portion of the withdrawn fuel;

deriving an actuator operating force using a second portion of the withdrawn fuel;

increasing the second portion of fuel to drive the actuator to a position which increases pump displacement while decreasing the first portion of bypassed fuel;

sensing the flow rate of fuel through the downstream manifold using a flow sensing valve that is connected to the downstream manifold;

matching the sensed flow rate of fuel with a demanded flow rate of fuel; and controlling the actuator operating force in response to differences between the sensed flow rate and the demanded flow rate to set the demanded flow rate of fuel through the downstream manifold.

23. A method of improving flow dynamics in a fuel metering system having a variable displacement pump interposed between an upstream manifold and a downstream manifold, and an actuator connected to the variable displacement pump, the position of the actuator varying the displacement of the pump, the method comprising the steps of:

pumping fuel from the upstream manifold to the downstream manifold using the variable displacement pump;

withdrawing a controlled amount of fuel from the downstream manifold;

bypassing a first portion of the withdrawn fuel;

deriving an actuator operating force using a second portion of the withdrawn fuel;

increasing the second portion of fuel to drive the actuator to a position which increases pump displacement while decreasing the first portion of bypassed fuel; and wherein the steps of bypassing and deriving are integrally performed by an electrohydraulic servo-valve, the electrohydraulic servo-valve having a fuel inlet connected to the downstream manifold to withdraw fuel, a fuel outlet connected to the upstream manifold, a fuel bypass variably connecting the inlet and the outlet, and a working output connection to the actuator.

24. A method of improving flow dynamics in a fuel metering system having a variable displacement pump interposed between an upstream manifold and a downstream manifold, and an actuator connected to the variable displacement pump the position of the actuator varying the displacement of the pump, the method comprising the steps of:

pumping fuel from the upstream manifold to the downstream manifold using the variable displacement pump;

withdrawing a controlled amount of fuel from the downstream manifold;

bypassing a first portion of the withdrawn fuel;

deriving an actuator operating force using a second portion of the withdrawn fuel;

increasing the second portion of fuel to drive the actuator to a position which increases pump displacement while decreasing the first portion of bypassed fuel; and returning bypassed fuel to the upstream manifold.

* * * * *